(12) United States Patent
Brodbeck et al.

(10) Patent No.: US 12,458,712 B2
(45) Date of Patent: Nov. 4, 2025

(54) CONTACTING SYSTEM AND USE OF THE CONTACTING SYSTEM

(71) Applicant: Galvosurge Dental AG, Widnau (CH)

(72) Inventors: Urs Brodbeck, Erlenbach (CH); Roger Eberle, Rebstein (CH); Bernd Jaenecke, Balgach (CH)

(73) Assignee: GALVOSURGE DENTAL AG, Widnau (CH)

( * ) Notice: Subject to any disclaimer, the term of this patent is extended or adjusted under 35 U.S.C. 154(b) by 841 days.

(21) Appl. No.: 17/630,960

(22) PCT Filed: Jul. 28, 2020

(86) PCT No.: PCT/EP2020/071219
§ 371 (c)(1),
(2) Date: Jan. 28, 2022

(87) PCT Pub. No.: WO2021/018871
PCT Pub. Date: Feb. 4, 2021

(65) Prior Publication Data
US 2023/0218787 A1   Jul. 13, 2023

(30) Foreign Application Priority Data
Jul. 30, 2019   (DE) .......................... 102019211370.2

(51) Int. Cl.
*A61L 2/00* (2006.01)
*A61L 2/03* (2006.01)
(Continued)

(52) U.S. Cl.
CPC ................. *A61L 2/035* (2013.01); *A61L 2/26* (2013.01); *A61L 2202/21* (2013.01)

(58) Field of Classification Search
CPC .......... A61C 8/0007; A61C 17/02; A61L 2/03
(Continued)

(56) References Cited

U.S. PATENT DOCUMENTS

2014/0003638 A1   1/2014   Barth
2015/0282907 A1   10/2015  Zipprich
(Continued)

FOREIGN PATENT DOCUMENTS

CN   1106955    8/1995
DE   4210491    10/1993
(Continued)

OTHER PUBLICATIONS

Applicant's Response filed May 14, 2021 in PCT/EP2020/071219.
(Continued)

*Primary Examiner* — Monzer R Chorbaji
(74) *Attorney, Agent, or Firm* — Weitzman Law Offices, LLC

(57) ABSTRACT

A contacting system (20) for electrical contacting of electrical conductor elements (14) embedded in an insulating sheath (10) of a cable harness (4*a*) is intended to —enable electrical contacting of the cable harness (4*a*) in a particularly simple and cost-effective manner that also meets high reliability requirements. According to the invention, this is achieved with a connection module (22), in the outer housing (25) of which a section of the cable harness (4*a*) can be fixed, and with a number of contact pins (36) which, viewed from the side relative to the longitudinal direction of the cable harness (4*a*), are guided transversely through the outer housing (25).

6 Claims, 8 Drawing Sheets

Figure 1:
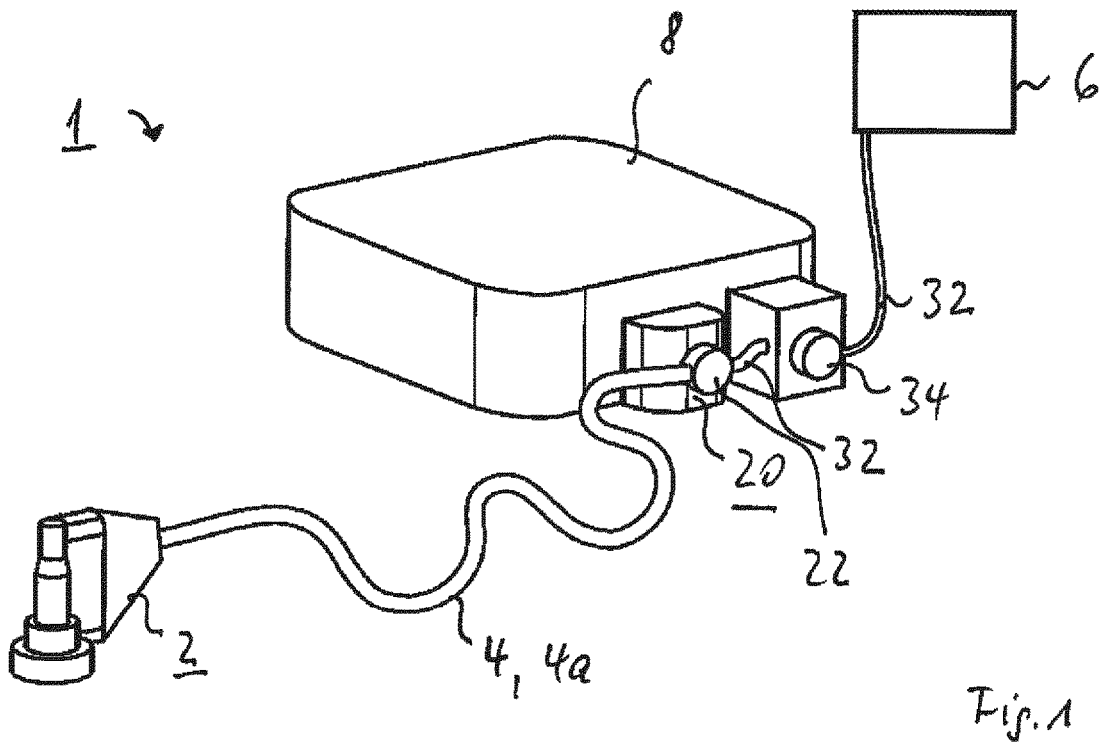

(51) Int. Cl.
*A61L 2/26* (2006.01)
*B01J 19/08* (2006.01)

(58) Field of Classification Search
USPC ................................ 422/22, 186.04, 186.05
See application file for complete search history.

(56) References Cited

U.S. PATENT DOCUMENTS

| | | | |
|---|---|---|---|
| 2016/0000947 A1 | 1/2016 | Brodbeck | |
| 2016/0021889 A1 | 1/2016 | Zipprich et al. | |
| 2017/0265968 A1* | 9/2017 | Brodbeck | ............ A61C 17/036 |

FOREIGN PATENT DOCUMENTS

| | | |
|---|---|---|
| DE | 102014216294 | 2/2016 |
| EP | 0891015 | 1/1999 |
| WO | 2014007577 | 1/2014 |
| WO | 2014075755 | 5/2014 |
| WO | 2014122187 | 8/2014 |
| WO | 2014122188 | 8/2014 |
| WO | 2016023998 | 2/2016 |

OTHER PUBLICATIONS

PRP received in PCT/EP2020/071219 mailed Oct. 18, 2021.
Written Opinion received in received in PCT/EP2020/071219 mailed Jun. 8, 2021 and Applicant's Response thereto.
Office Action received in DE102019211370 mailed May 4, 2020.
Office Action received in JP2022506696 mailed Apr. 2, 2024.
International Search Report received in PCT/EP2020/071219, mailed Oct. 15, 2020.
Written Opinion received in PCT/EP2020/071219, mailed Oct. 15, 2020.
First Office Action received in CN202080068016 mailed May 23, 2024 (machine translation).

* cited by examiner

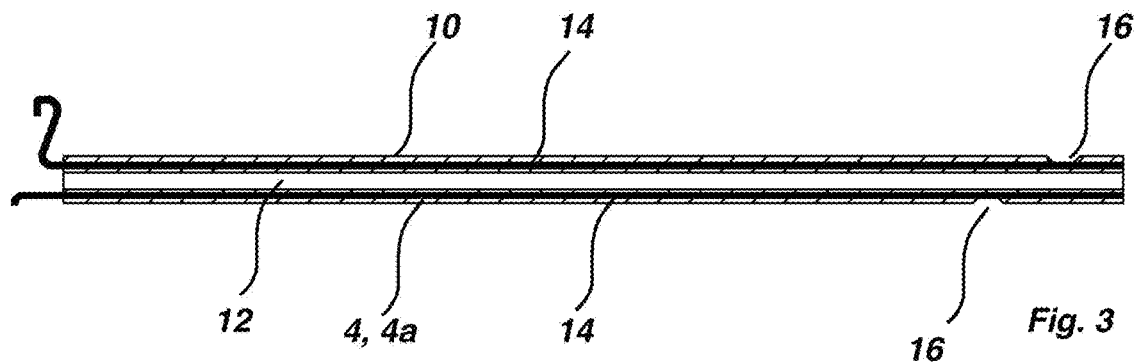
Fig. 3
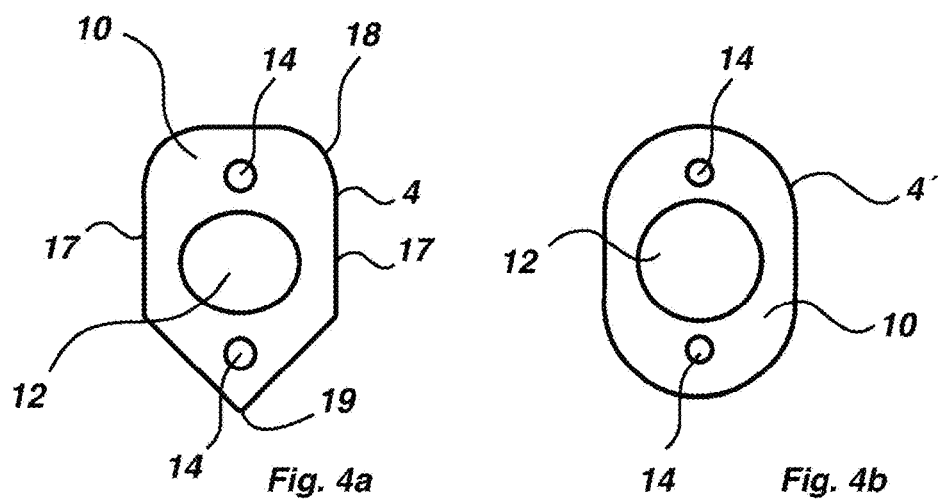
Fig. 4a
Fig. 4b
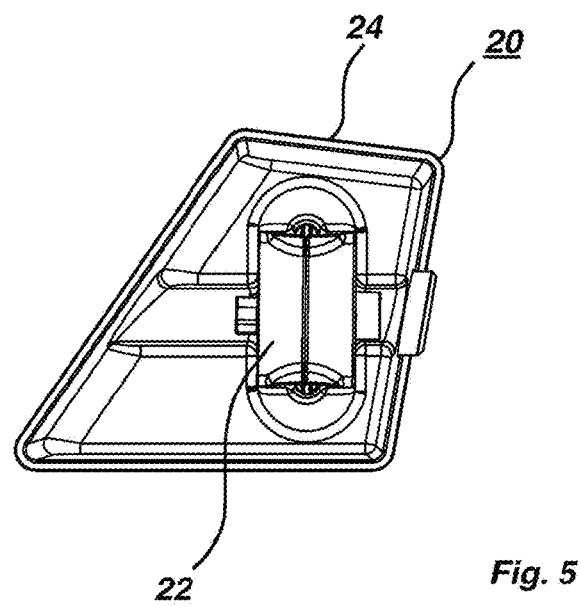
Fig. 5

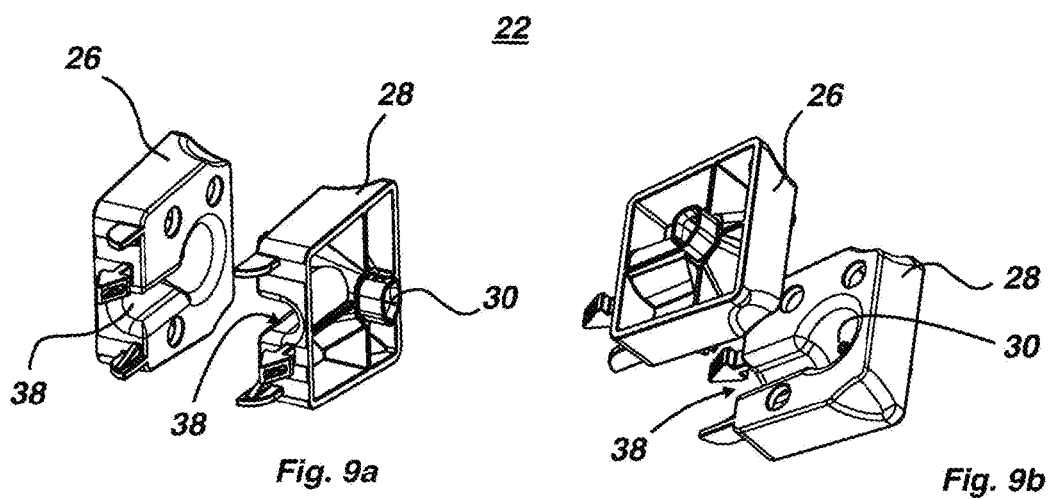
*Fig. 9a*  *Fig. 9b*
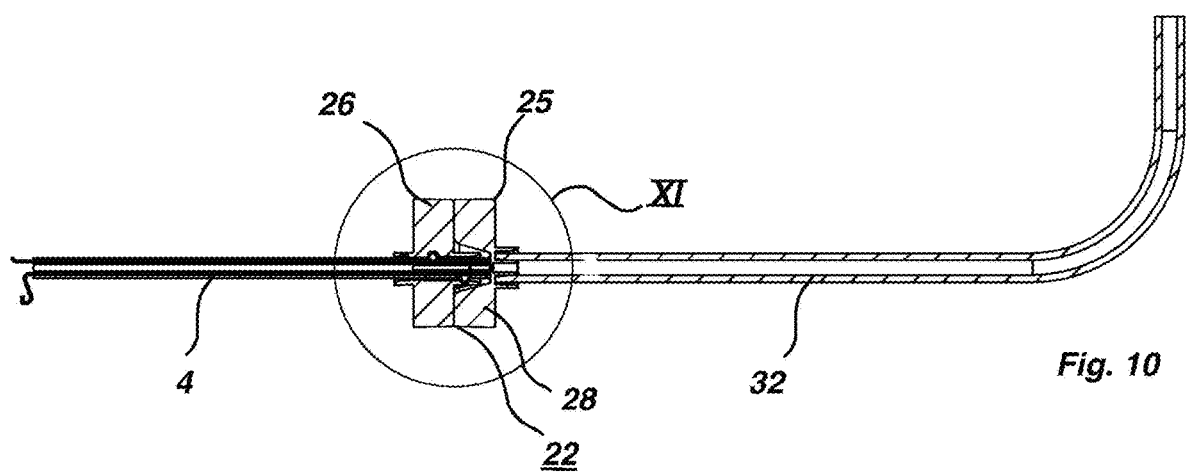
*Fig. 10*

CONTACTING SYSTEM AND USE OF THE CONTACTING SYSTEM

The invention relates to a contacting system for the electrical contacting of electrical conductor elements embedded in an insulating sheath of a cable harness. It further relates to the use of such a contacting system.

From WO 2014/075755 A1, WO 2014/122187 A1, WO 2014/122188 A1 and WO 2016/023998 A1, the disclosures of which are incorporated herein by reference, a treatment element, in particular for use with an implant part, as well as a method for cleaning a dental implant part are respectively known. Such cleaning of an implant part may be desirable or necessary to ensure the retention of the inserted implant in the bone substance. Indeed, a biofilm can form on the solid surface of implants, which is enclosed by tissue and tissue fluid, containing bacteria that can ultimately lead to chronic and recurrent infections. This clinical picture is called peri-implantitis. Particularly in the dental area, similar to periodontitis, a combination of neglected—oral hygiene, adhesion of biofilm to the usually microrough surface of the dental implant, and other factors is the cause of the full-blown periimplantitis, which is characterised by increasing stress and destruction of the hard and soft tissue. The areas where the hard and/or soft tissue retracts are usually covered with a biofilm.

The cleaning process described in the above applications is based on the concept of killing and removing the biofilm or germs forming the contamination starting from the implant surface without damaging the implant surface. For this purpose, an electrolytic process is provided in which ions (cations and/or anions) are transported through the biofilm by means of electrostatic forces. These ions react chemically or electrochemically at the implant surface. Through these reactions, new compounds of substances are created and/or the ions themselves and/or parts of these ions are converted into the atomic state. In addition, there is also the possibility that the ions react with the surface material (e.g. formation of an oxide layer or material removal). On the one hand, this process kills germs due to the chemical substances formed, but on the other hand, it also causes the formation of gas bubbles that mechanically remove the biofilm.

The germicidal effect of this process is based on different effects. On the one hand, ions from the biofilm itself (also from the bacteria) are transported to the anode or cathode by applying an electrical voltage. This can lead to the killing of bacteria and viruses. In addition, as the ions pass through the biofilm, they can undergo biochemical reactions, which can also lead to the killing of bacteria and/or viruses. Another possibility for killing is that the newly formed substance compounds on the implant surface have antibacterial and/or antiviral and/or antifungal effects. Of course, this can also happen when the ions change to the atomic state.

The treatment element described in the aforementioned applications is specifically designed to perform this cleaning process directly on the inserted dental implant, i.e. preferably while the post part is in the bone in the patient's mouth. For this purpose, the treatment element is designed to be connected directly to the inserted post part and then to apply a suitable treatment liquid, which can serve as the basis for the desired electrolytic process when exposed to electric current, in the immediate vicinity of the inserted post part in the affected spatial area of the adjacent bone substance and to apply the electric current. The use of this treatment element thus requires the establishment of both mechanical and electrical contact with the inserted post part. For this purpose, in the design of the treatment element described in the said application, the prosthetics on the dental implant and, if necessary, also its abutment must generally be temporarily removed for the purpose of fixing it to the post part.

It is thus an object of the present invention to provide a contacting system of the above-mentioned type which enables electrical contacting of a cable harness intended for use with a treatment system of the above-mentioned type in a particularly simple and cost-effective manner which also satisfies high reliability requirements.

This object according to the invention is achieved with a connection module, in the outer housing of which a section of the cable harness can be fixed, and with a number of contact pins which, viewed from the side relative to the longitudinal direction of the cable harness, are passed transversely through the outer housing. Advantageous embodiments of the invention are the subject of the subclaims. —Further and/or alternative advantageous embodiments of the invention as well as further embodiments considered as independent inventions may also be derived from the description of the figures.

The invention is based on the consideration that, especially when used in a treatment system of the type mentioned above, the cable harness should be able to be contacted by means that are kept particularly simple and, in particular, can be used without further ado even by a user who has not received further training. However, in order to nevertheless meet the comparatively high demands on the reliability of the contacting, especially in applications in the medical field, the contacting system should be designed to be particularly fault-tolerant while being easy to handle. In order to make this possible, contacting of the conductor elements in the cable harness is provided by contact pins which are aligned in the manner of a "crossing cable guide" with their longitudinal direction transverse to the longitudinal direction of the cable harness and thus of the conductor elements guided therein. In this way, reliable contacting can be achieved by forming a contact point between the contact pin on the one hand and the associated conductor element on the other, without the need for precise positioning of the cable harness or contact pins, each as seen in their longitudinal direction.

Advantageously, the contact pins are also positioned at a distance from each other in such a way that the cable strand stripped in the partial section fits straight between the contact pins, especially preferably with a slight clamping effect. Thus, on the one hand, in the manner of a double function, the contact pins can also effect or at least support the mechanical fixing of the partial section of the cable harness in the outer housing of the connection module in addition to the actual electrical contacting. On the other hand, a particularly close contact between the respective contact pin and the associated conductor element is established, so that the reliability of the electrical connection is increased even further.

Very advantageously, the contact system is used in a treatment system of the type mentioned above.

Figure 2:
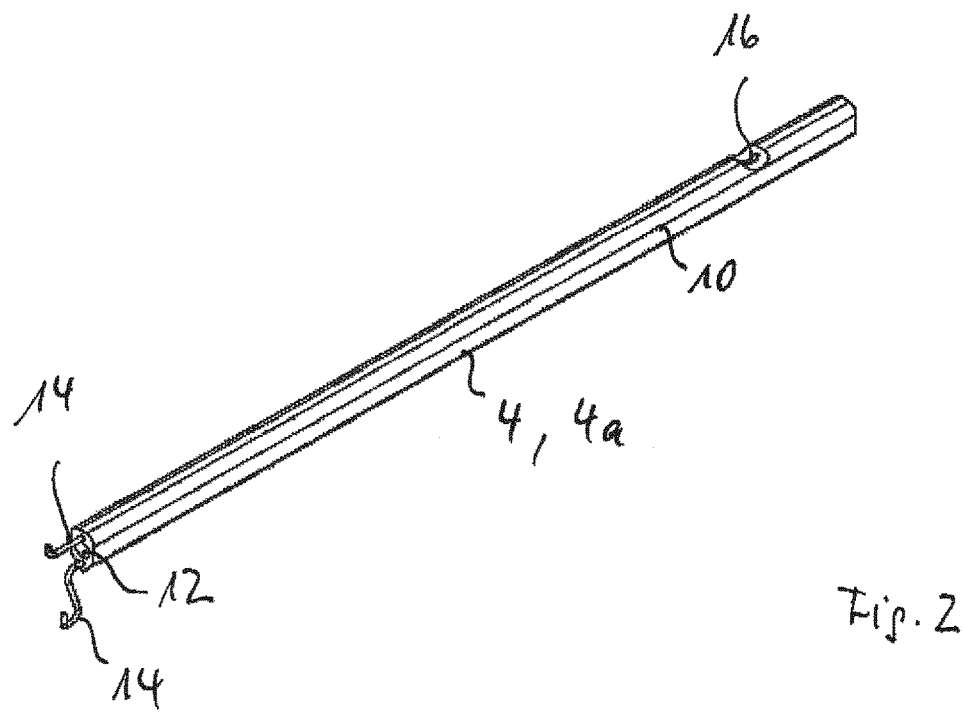
Figure 6:
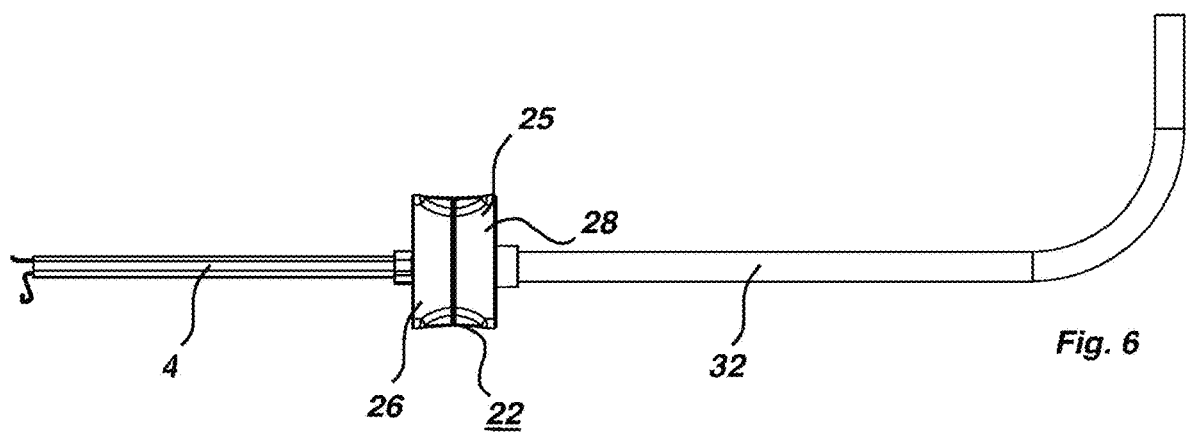
Figure 7:
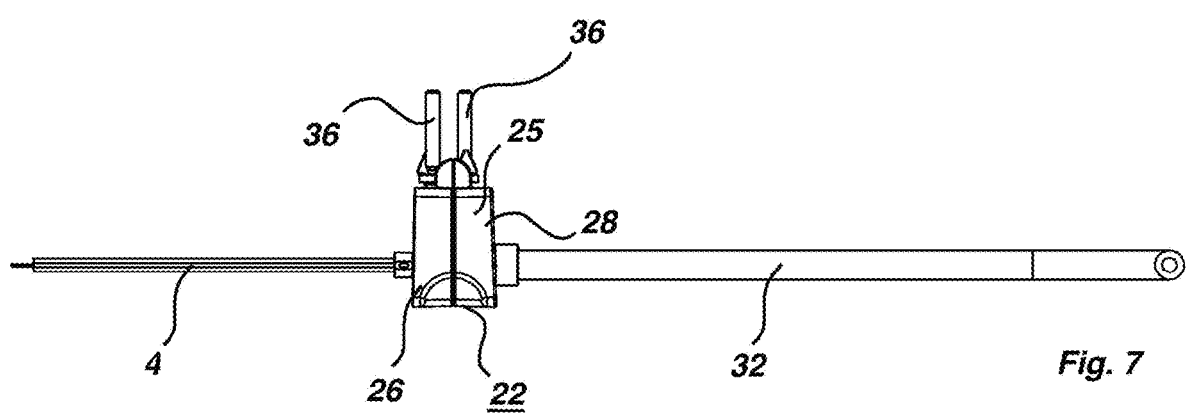
Figure 8:
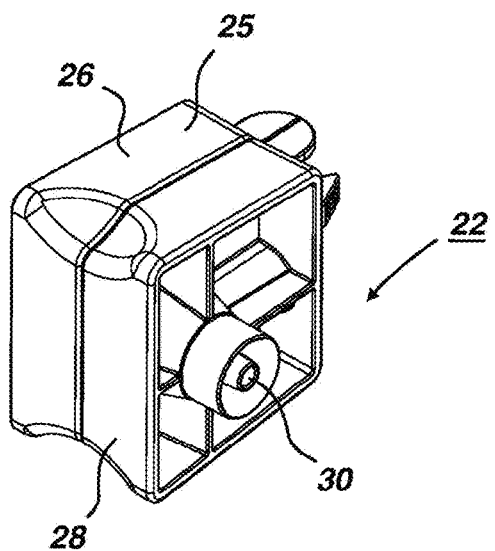
Figure 11A:
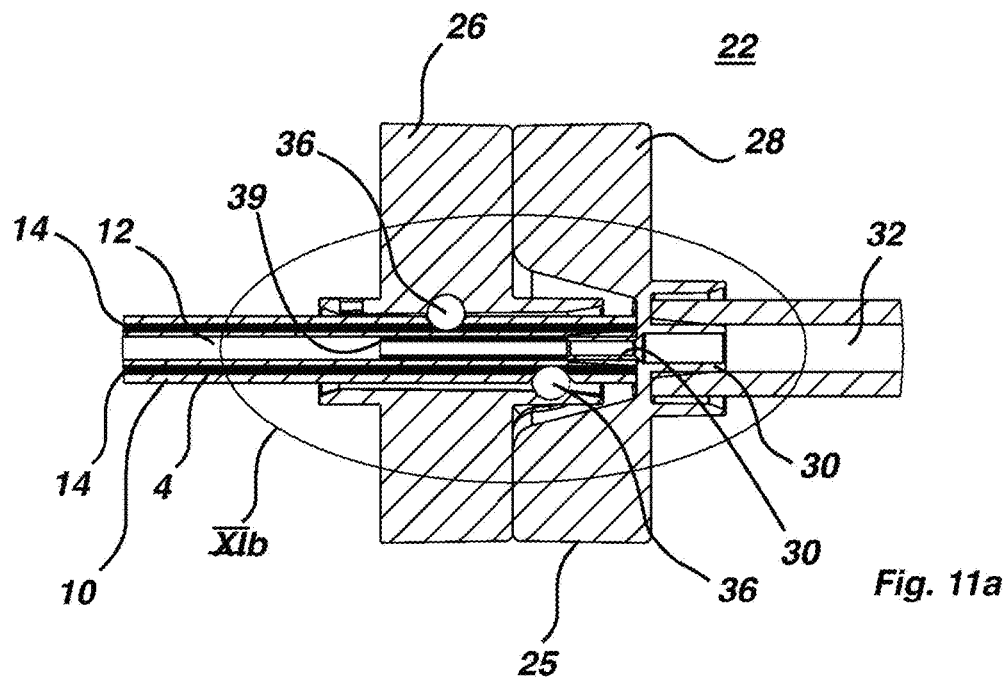
Figure 11B:
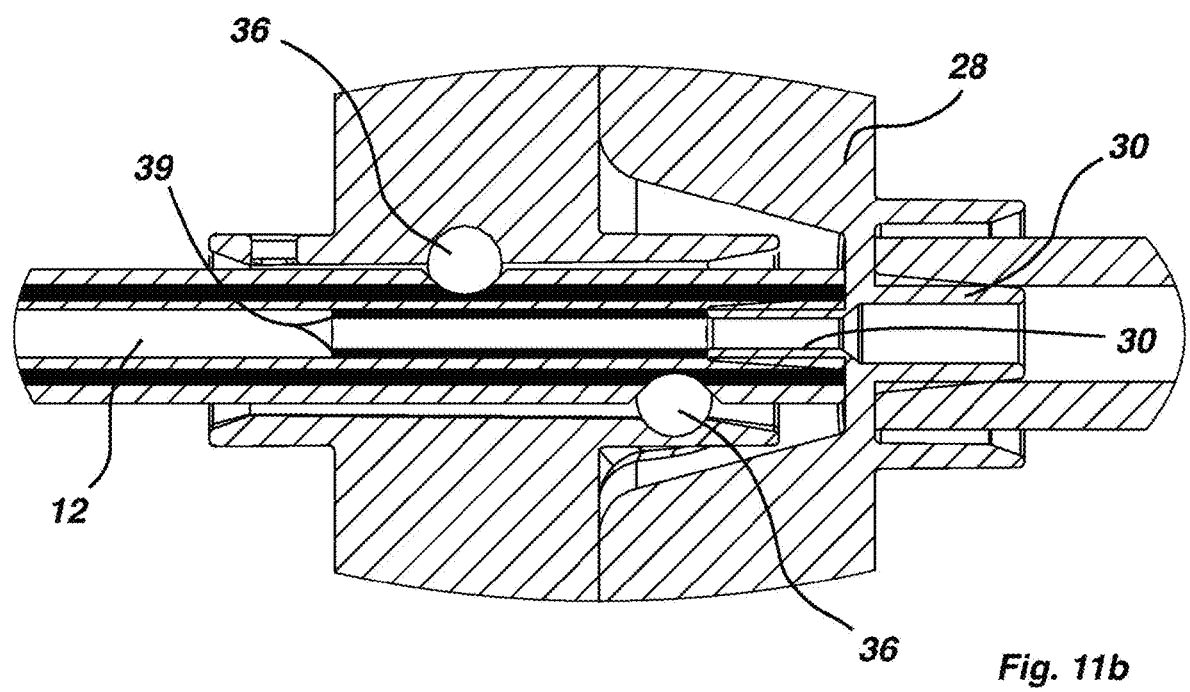
Figure 12:
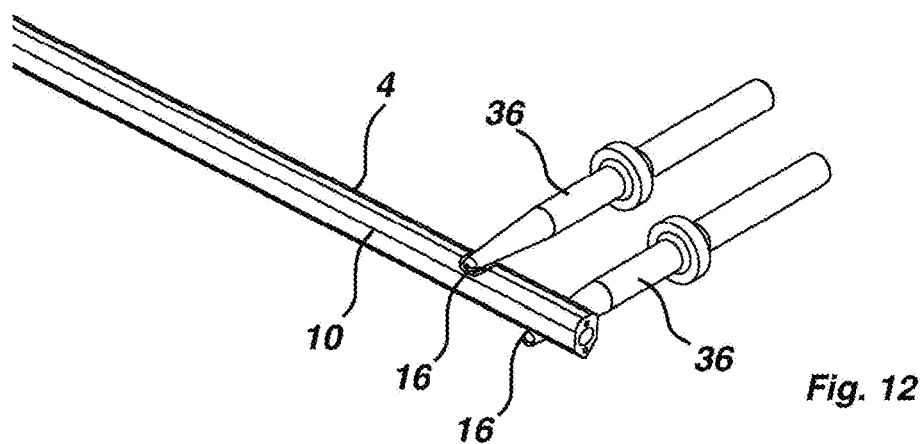
Figure 13:
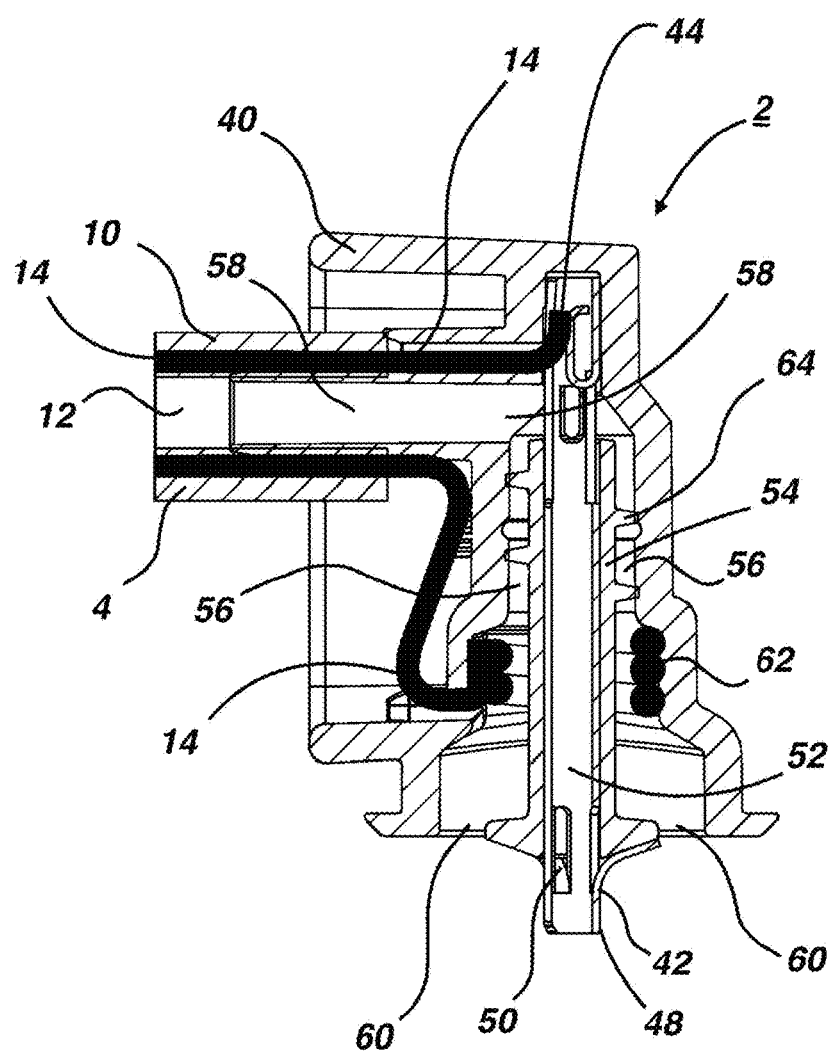
Figure 14:
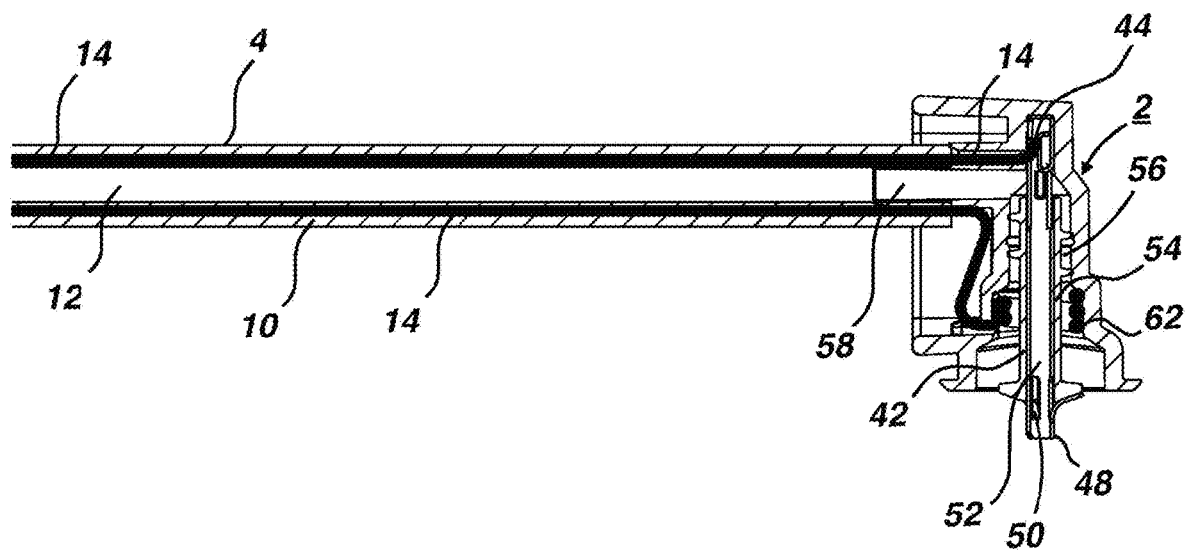
Figures 15A, 15B:
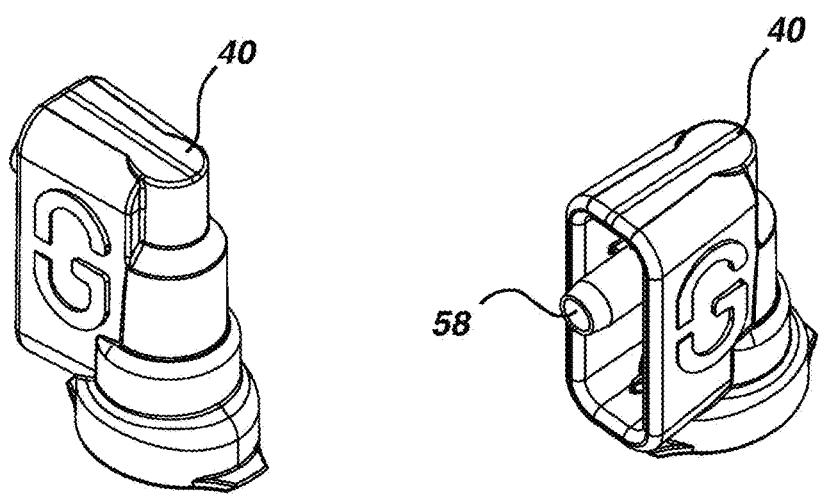
Figure 16:
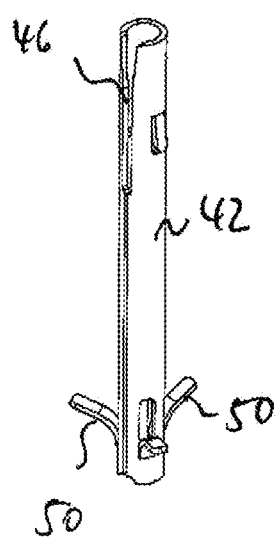
Figure 17:
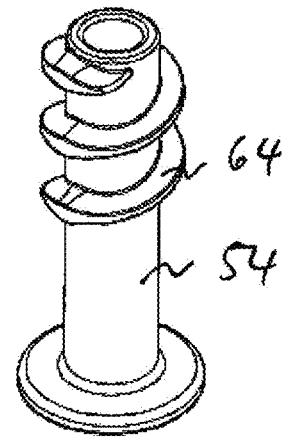
Figure 18:
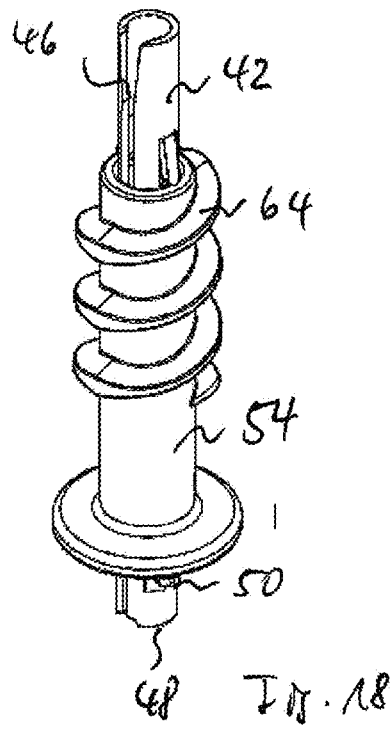
Figure 19:
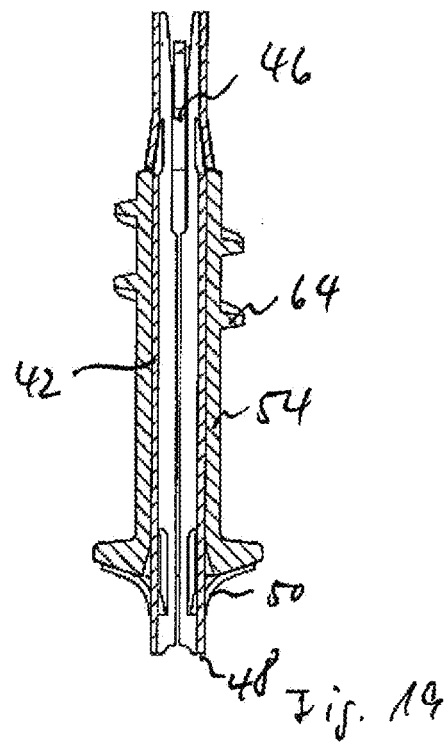

An embodiment of the invention is explained in more detail with reference to a drawing. Shown therein:

FIG. 1 a treatment system for cleaning a component contaminated with biofilm,

FIG. 2 a connection tube of the treatment system according to FIG. 1 in perspective view, FIG. 3 a longitudinal section of the connecting tube as shown in FIG. 2, FIG. 4 the connecting tube according to FIG. 2 in two variants in cross-section, FIG. 5 a side view of a contacting system of the treatment system according to FIG. 1, FIG. 6 a connection module of the contacting system according to FIG. 5 with connected connection hose in side view, FIG. 7 the connection module as shown in FIG. 6 in plan view, FIG. 8 the connection module according to FIG. 6 in perspective view, FIG. 9 the connection module according to FIG. 6 with separate housing halves in different views, FIG. 10 the connection module according to FIG. 6 in longitudinal section, FIG. 11 an enlarged section of FIG. 10, FIG. 12 the components provided for making an electrical contact, FIG. 13 a treatment head of the treatment system according to FIG. 1 in longitudinal section, FIG. 14 a longitudinal section of the treatment head as shown in FIG. 13 with the connecting tube attached, FIG. 15 the outer housing of the treatment head according to FIG. 13 in two perspective views, FIG. 16 a perspective view of a connecting pin of the treatment head according to FIG. 13, FIG. 17 an insulator body, FIG. 18 a perspective view of the connecting pin of FIG. 16 inserted into the insulator body of FIG. 17, and FIG. 19 a longitudinal section of the connecting pin shown in FIG. 16 inserted into the insulator body shown in FIG. 17.

Identical parts are marked with the same reference signs in all figures.

In general, with dental implant systems, in particular also with two-piece implant systems, and possibly also with other medical implants, there is the problem that—inflammations or foci of inflammation can develop due to the penetration of bacteria or germs into the tissue area near the insertion site, in particular in the area of the—external thread inserted into the jaw. Such inflammations, especially those resulting from so-called peri-implantitis, can lead to serious impairment of the tissue and bone in the area of the insertion site, especially if they develop and solidify over a longer period of time. Without suitable countermeasures, these impairments can lead to the entire implant system having to be removed from the bone again and, after bone augmentation, fitted with an implant system again or replaced with other prosthetics. This extremely undesirable effect caused by peri-implantitis can thus lead to a total loss of the implant system, so that renewed surgical measures such as scraping out the affected area in the jawbone and re-provisioning with an implant system may become necessary. Such a removal can also lead to bone loss or other loss of tissue substance, which in extreme cases can lead to a situation where a new restoration with another implant is no longer possible. Such a need for a new restoration caused by peri-implantitis can also occur after comparatively long periods of time after the first insertion of the implant system, for example up to several years or even decades.

The germs or bacteria observed in connection with peri-implantitis can in principle—colonise the interior of the components of the implant, but as a rule they prefer to adhere directly to the surface of the dental implant inserted into the jawbone in the area of contact with the surrounding tissue or bone material, i.e. in particular in the area of the external thread. In this area, the surface of the dental implant can be—provided with a roughening or the like in order to particularly favour the ingrowth into the tissue or bone and to support the healing of the dental implant after insertion. However, it is precisely in the area of such a roughened surface, which is actually considered to be particularly favourable for the implant system, that the settlement of germs or bacteria can increase, whereby the roughness makes the targeted removal of the existing germs or bacteria even more difficult.

Therefore, there is an urgent desire for suitable countermeasures in order to be able to effectively combat the source of inflammation and kill and/or remove the invading germs in the event of a peri-implantitis that is developing or has already occurred, while preserving the implant system that has already been inserted, so that healthy tissue or healthy bone substance can subsequently form again in the area around the external thread. For this purpose, it is desirable, in addition to a targeted killing of the germs or bacteria in the affected area, to also reliably remove their material residues and fragments from the affected area of the space, so that the affected area can then be filled again by healthy tissue or bone material and an intimate connection between the outer surface of the dental implant and the surrounding tissue or bone material can be formed again. In addition, the biofilm formed by the bacterial coating, including the organic remains of killed bacteria, should be reliably removed.

For this purpose, i.e. for killing and/or mechanically detaching germs or bacteria in the insertion area of the dental implant and in particular also for subsequent rinsing, removal and discharge of the tissue and material residues of the killed bacteria, the treatment system 1 shown in FIG. 1 is provided. With regard to its design and principle execution, this is based on two basic concepts which are each considered to be independently inventive: On the one hand, it is designed as a primary design objective to detach any residues or fragments of germs and/or bacteria still adhering to the surface of the dental implant, in particular in the area of the external thread,—from the external surface of the dental implant by means of a suitable application of current or current surges, so that they can subsequently be washed out. On the other hand, it is additionally also designed to specifically kill the germs or bacteria present in the insertion area of the implant by the targeted supply of a bacteriocidal cleaning agent or disinfectant that is, however, compatible with the human organism.

Accordingly, the treatment system 1 as shown in FIG. 1 is designed for cleaning a biofilm-contaminated component, in particular an implant component, using an electrolytic cleaning concept as known, for example, from WO 2014/075755 A1, WO 2014/122187 A1, WO 2014/122188 A1 and WO 2016/023998 A1. The treatment system 1 is thus adapted to apply a specific, suitably selected treatment fluid to the component requiring treatment and then or thereby to generate a current flow through the component requiring treatment and the treatment fluid. For this purpose, the treatment system 1 comprises a treatment head 2 which can be mechanically connected to the component requiring treatment, for example plugged, screwed or pressed onto it, and via which both the treatment liquid can be applied to the—component requiring treatment and the electrical contacting for setting the desired current flow can be carried out. The treatment head 2 is connected via a connecting hose 4 both on the media side to a reservoir 6 for the treatment liquid and electrically to an electrical supply unit 8 provided as a current or voltage source for setting the desired current flow.

Among other things, the treatment system 1 is specifically designed for particularly easy and reliable handling. In order to particularly facilitate this, the connection hose 4 is provided in the form of an integrated component for both the media-side and the electrical connection of the treatment head 2 with the storage container 6 or the supply unit 8. Thus, when using the treatment system 1, it is not necessary to—operate and coordinate several different connection hoses, connection wires or the like.

The connecting hose 4 is shown in FIG. 2 in perspective view, in FIG. 3 in longitudinal section and in FIG. 4 in cross-section in two embodiments, each with a very particularly preferred cross-sectional contour, each considered to be independently inventive (FIG. 4*a* and FIG. 4*b* respectively). In the sense of the above-mentioned embodiment as an integrated component, the connecting hose 4 is essentially formed by a sheath 10 made of a suitably selected hose material, particularly preferably PVC, TPU or silicone. The sheath 10 has a media channel 12 in its interior, through which the treatment fluid can flow from the reservoir 6 to the treatment head 2. The jacket 10 also integrates a number of, in the embodiment example two, electrical conduction elements 14. With regard to the intended functions of the connecting hose 4, the design criteria for the selection of the sheath material are particularly preferably based on, on the one hand, sufficient inertness with respect to the medium to be transported in the medium channel 12 (i.e. it should be avoided that the sheath material reacts chemically or in any other way with the medium or is attacked by it) and, on the other hand, sufficient insulation properties (i.e. the sheath 10 should form a suitable electrically insulating matrix for the conductor elements 14). In the embodiment example, the conductive elements 14, for example copper and/or aluminium wires, cables or strands, are cast into the sheath 10 or inserted during extrusion; however, they may also be arranged on the outside of the sheath 10 under suitable insulation. With regard to the electrical-properties, the connecting tube 4 can thus be regarded as a cable harness 4*a*, in which a number of electrical line elements 14 are guided in a sheath 10.

In an end region, the sheath 10 of the connection tube 4 has a respective bulge 16 for each of the conductor elements 14, in which the respective conductor element 14 is held free of the sheath material. In the area of the respective bulge 16, the respective conductor element 14 is thus uninsulated and thus electrically-contactable; according to the following description, the electrical connection of the respective conductor element 14 with a suitable contact pin is thus made possible.

According to an embodiment considered to be independently inventive, the connecting tube may have in cross-section the contour shown in FIG. 4*a*. The sheath 10 thereby forms two substantially two parallel side surfaces 17 which can be grasped by the user in the manner of gripping surfaces. The side surfaces 17 are connected to each other in their first end region by a rounded contour 18, whereas the second end region connecting the side surfaces 17 forms a corner or edge 19. This contouring makes it particularly easy and reliable for the assembly or also for the user to detect and recognise the position and orientation of the connecting hose 4 and the conduit elements 14 integrated therein on a haptic basis alone, i.e. by feel and without having to look at the connecting hose. Particularly in an embodiment in which the correct individual assignment and handling of the conductor elements 14 is important, such as for maintaining a predetermined electrical polarity of the conductor elements 14 during assembly or also operation of the overall system, this or a similar cross-sectional shape increases the user-friendliness and reliability of the system quite considerably. In an alternative, also particularly preferred embodiment, the sheath 10 of the connecting hose 4' can also have the contour shown in the cross-sectional representation in FIG. 4*b*. In this case, the connecting hose 4' or the sheath 10 forming its outer region is designed with an oval, or more generally non-round, cross-section. This also achieves in a particularly advantageous manner that information about the spatial orientation and thus, for example, about a correct installation position is available in a purely haptic manner during installation, i.e. only via the feel of the grip.

The embodiment of the connecting hose 4, 4' as described, generally as a hose or cable harness 4*a* with a media channel 12 surrounded by a sheath 10, wherein a number of electrical conduction elements 14 are arranged in or on the sheath 10,—and/or its use in a treatment system 1 of the type described, are considered to be independently inventive. The contour of the cross-section as shown in FIG. 4*a* is furthermore considered to be independently inventive for hoses in general or also electrical lines, cables or cable harnesses, whereby in all these cases the haptic detection of the spatial orientation and thus, for example, of a correct polarity or orientation is made possible due to the cross-sectional contour.

For the electrical connection of the line elements 14 with the electrical supply unit 8, the latter is provided with a contacting system 20. The contacting of the line elements 14 is designed in particular with regard to the reliability required and mandatory for medical applications on the one hand, but also for comparatively simple operability on the other hand. For this purpose, the contacting system 20,— shown enlarged in sections in FIG. 5, comprises a connection module 22 which is—provided for receiving a partial section of the cable harness 4*a* and which can be—plugged or inserted into a corresponding contact socket 24 attached to the electrical supply unit 8.

The connection module 22 is also considered to be independently inventive with respect to the embodiments explained in more detail below. It is shown in more detail in FIGS. 6-11, namely in FIGS. 6 and 7 in the state connected to the connecting hose 4 in lateral view and in plan view, in FIG. 8 in perspective view, in FIG. 9 in exploded view of its outer housing 25, and in FIGS. 10 and 11 in longitudinal section. As can be seen from these illustrations, the outer housing 25 of the connection module 22 in the embodiment example is formed by two housing halves 26, 28 which can be plugged together, the connection hose 4 being introduced through the first housing half 26 into the interior of the housing and being plugged with its media channel 12 onto a hose nozzle or hose socket 30 arranged in the interior of the housing on the second housing half 28. The connecting hose 4 is thus fixed with its end section inside the outer housing 25 of the connection module 22 formed by the housing halves 26, 28. The hose nozzle 30 is in turn passed through the second housing half 28 and connected on the outside of the housing to a supply hose 32, which is in turn connected to the supply container 6 via a pump 34.

In its end region, immediately adjacent to the hose grommet 30 and inside the outer casing 25, the bulges 16 of the connecting hose 4 are positioned. At this point, the cable harness 4*a* formed by the connecting hose 4 is thus stripped from the outside, i.e. the sheath 10 is removed or thinned there in the outer region to the extent that the conductor elements 14 are exposed in this region, have no insulation and can thus be contacted electrically. For contacting these exposed areas of the conductor elements 14, two suitable contacting elements with a geometry suitable for contacting, for example a radius, a cone or a bevel, are provided. In the embodiment example, these contacting elements are designed as contact pins 36 which, viewed from the side relative to the longitudinal direction of the cable harness 4a, are—passed transversely through the outer housing 25 of the connection module 22. In the embodiment example, these contact pins 36 are fixedly mounted in the contact socket 24 and are suitably connected in the electrical supply unit 8 to the supply components provided there, such as current or voltage sources. Corresponding to the contact pins 36, the housing halves 26, 28 have suitable feed-through holes 38 for the contact pins 36. In this way and by means of the components mentioned, the media channel is split open or split off from the current conductors in the cable harness.

When the connection module 22 provided with the end-side region of the connection tube 4 is inserted into the contact box 24, the contact pins 36 are thus introduced into the feed-through holes 38 and project through them transversely to the longitudinal direction of the cable harness 4a into the interior of the outer housing 25 formed by the housing halves 26, 28. There they can contact the cable harness 4a formed by the connection tube 4. When inserted, the cable harness is pushed between the contact pins 36 in an orientation transverse to them in such a way that each of the stripped conductor elements 14 arranged on the outside faces one of the contact pins 36. The contact pins 36 are spaced apart relative to each other and otherwise positioned within the housing in such a way that the connecting tube 4 fits with its stripped end region straight, preferably slightly clamped, between the contact pins 36 and thus a reliable electrical contact is formed between the respective contact pin 36 and the associated conductor element 14. The contacting principle is illustrated in the perspective view shown in FIG. 12, in which only the contact pins 36—which in the embodiment are mounted firmly in the contact box 24—and the connecting tube 4 lying between them at the ends are shown, omitting the other—components. It can be clearly seen how the contact pins 36 each engage in the associated bulge 16 in the sheath 10 of the connecting tube 4 and thereby contact the respective inner conductor element 14.

In such a plugged-in state of the end part of the connecting tube 4, the contact pins 36 exert a certain, preferably springy, pressure on the conductor elements 14 guided in the connecting tube 4, in particular to ensure reliable and stable electrical contacting in this area. However, due to the choice of material of the hose material, this could lead to an unintentional compression of the hose in the contact area if the conductor elements 14 yield to the pressure as a result of the contacting and give way inwards. This could, on the one hand, weaken the electrical contact and, on the other hand, lead to an undesired narrowing of the inner cross-section of the connecting hose 4, so that the flow of the medium would be impaired. In order to counteract this, the media channel 12 of the connecting hose 4 in an independently inventive design is provided with an integrated stiffening element, preferably an inner tube made of 39 metal, ceramic or another suitable material, in its end-side region directly adjacent to the actual end region, which receives the hose nozzle 30 in the assembled state, as can be seen in FIG. 11 and in particular in the enlarged section in FIG. 11b. The inner tube, which is preferably comparatively thin-walled, is positioned in particular at the end inside the media channel 12 in such a way that it abuts the end face of the hose nozzle 30 with its end face directed towards the end.

Preferably, the connecting tube 4 is inserted between the contact pins 36 with its longitudinal direction substantially perpendicular to the longitudinal direction of the contact pins 36, as is also shown in the embodiment example according to FIG. 12. The substantially crossing alignment of the longitudinal directions of the contact pins 36 on the one hand and of the conductor elements 14 in the cable harness 4a on the other hand ensures that neither a local displacement of the connecting hose 4 or cable harness 4a in its longitudinal direction nor an inaccuracy of the insertion depth of the connecting hose 4 in the longitudinal direction of the contact pins 36—endangers or impairs the formation of a respective contact point between one of the conductor elements 14 and one of the contact pins 36. Such a system of "crossing conductor elements" is thus particularly insensitive to inaccuracies during final assembly and thus particularly reliable in operation and simple in assembly.

Alternatively, the contact pins 36 could of course also be firmly connected to the connection module 22, in which case contact or receiving holes in the manner of a socket would have to be provided in the contact box 24 accordingly and correspondingly suitably.

The embodiment of the contacting system 20 in the manner described, generally as a combination of a connection module 22 with a contact socket 24, in which an electrical contact to the conductor elements 14 guided in the outer sheath region of a hose or cable is effected via contact pins 36 aligned transversely to these, preferably substantially perpendicularly thereto, and/or its use in a treatment system 1 of the type described are regarded as independently inventive.

According to the concept described in WO 2014/075755 A1, WO 2014/122187 A1, WO 2014/122188 A1 and/or WO 2016/023998 A1, the treatment system 1 is—designed to conduct the current flow provided for cleaning purposes of the—component requiring treatment specifically through the surface requiring treatment by using the conductivity of the treatment liquid provided. On the one hand, the treatment head 2 is constructed according to the design principle that the electric current can be supplied to the component requiring treatment and this can be used as an electrode. On the other hand, the use of the electrical conductivity of the treatment liquid supplied via the treatment head 2 is provided for the formation of a counter-pole or counter-electrode.

For this purpose, the treatment head 2 has a structure as shown in section in FIGS. 13 (enlarged) and 14. Inside the outer housing 40 shown in FIGS. 15a and 15b in two different perspectives, into which the free end of the connecting tube 4 is inserted, a connecting pin 42 is arranged on the one hand for forming a first electrode connection, preferably the cathode connection. The connecting pin 42, shown—enlarged in FIG. 16, is electrically highly conductive and is preferably made of a metal, very particularly preferably of titanium. Very preferably and with regard to particularly low manufacturing costs, the connecting pin 42 is made of a stamped, bent and/or rolled metal sheet, particularly preferably of titanium sheet. At its "upper end" inside the outer housing in the installed state, the connecting pin 42 is connected to one of the conductor elements 14 of the connecting tube 4, so that it can be directly electrically controlled and used to establish an electrodic connection when the connecting tube 4 is connected to the electrical supply unit 8.

In a particularly preferred embodiment, which is also considered to be independently inventive, the connecting pin 42 is thereby designed, particularly preferably in combination with the end 44 of the corresponding conductor element 14 provided for establishing this electrical connection, to ensure a particularly reliable electrical contact. For this purpose, on the one hand, as can be readily seen from the sectional view in FIG. 13, the end 44 of the conductor element is bent so that the end region can rest resiliently against the upper end of the connecting pin 42. In addition, the connecting pin 42 has a V-shaped recess 46 in its upper end region, into which the end 44 can be inserted, preferably in a clamping manner.

At its free end 48, which is "lower" in the installed state, the connecting pin 42 is suitably designed to be placed on the component requiring treatment. Particularly preferably, the treatment system 1 is intended for treating inserted medical implants in general. In the embodiment example, the treatment system 1 is specifically—designed for the very particularly preferred treatment or preparation of inserted— dental implants. Accordingly, the connecting pin 42 in the embodiment example is suitably designed to be placed on an inserted dental implant. If this has an internal connection for an associated abutment or abutment, the free end 48 is preferably—adapted to the dimensions of this internal connection so that it can be inserted appropriately into the implant to be treated. To ensure particularly reliable electrical contact of the connecting pin 42 with the component requiring treatment, the connecting pin 42 is also provided at its free end with a number of bent-out spring bars 50. These make intimate electrical contact with a suitable dental implant when it is placed on the implant.

The connecting pin 42 is primarily intended to establish the electrical connection with the component requiring treatment, in particular the dental implant, so that this can be used as an electrode for the cleaning process. Accordingly, the connecting pin 42 could also be designed as a—preferably metallic—solid body, since good electrical conductivity is considered to be the most significant design criterion—in addition to, for example, biological compatibility and the like. In the embodiment example, however, a particularly preferred embodiment is shown in which the connecting pin 42 is designed as a hollow body in the manner of a tube. This hollow body, obtainable for example by rolling a previously suitably punched metal sheet, forms an inner channel 52 through which treatment fluid can be introduced into the interior of the implant located underneath and used there for cleaning purposes, for example in the manner of rinsing by a flushing solution. In addition, cleaning can also take place in the inner area of the implant in this way.

As can also be seen from the illustration in FIG. 13, the connecting pin 42 is arranged in an insulator body 54 surrounding it, in particular inserted into it. The insulator body 54 shown separately in FIG. 17 is preferably made of a suitably selected plastic, preferably by injection moulding. FIG. 18 shows the connecting pin 42 inserted into the insulator body 54.

The insulator body 54 is in turn surrounded by a cavity 56 within the outer housing 40 of the treatment head 2, as is clear in particular from the illustration in FIG. 13,—which cavity 56 is connected to the media channel 12 of the connecting hose 4 via a media channel 58 integrated into the treatment head 2. Via the media channel 58, treatment fluid can thus be introduced from the media channel 12 of the connection tube 4 into the cavity 56 in the treatment head 2. In its "lower" area of the treatment head 2, facing the free end and the component requiring treatment, the cavity 56 widens and forms an annular outflow surface 60 around the centrally guided connecting pin 42 and the insulator body 54 surrounding it, through which the supplied treatment fluid can emerge and flow towards the component requiring treatment.

To form a counter pole or counter electrode for carrying out the electrolytic treatment and cleaning concept, as known in principle from WO 2014/075755 A1, WO 2014/122187 A1, WO 2014/122188 A1 and WO 2016/023998 A1, the use of the electrical conductivity of the treatment liquid supplied via the treatment head 2 into the cavity 56 and from there to the component requiring treatment is provided, as already mentioned. To make this possible, an electrode 62 is arranged in the cavity 56, which is electrically connected to the other conductor element 14 of the connecting hose 4. The electrode 62 is basically ring-shaped and is arranged in the cavity 56 in such a way that the treatment fluid flowing through it flows around it and wets it intensively. Thus, when the connection tube 4 is connected to the electrical supply unit 8, the treatment fluid in the cavity 56 and accordingly also in the area—immediately adjacent to the outflow surface 60 can be electrically controlled via the electrical supply unit 8 and used to establish an electrodic connection.

On the one hand, the electrode 62 is designed for particularly good electrical contact with the treatment liquid flowing around it. This is achieved or at least favoured by the shape of the electrode 62, which is considered to be independently inventive: the ring shape already enables a uniform and large-area contacting of the liquid. In-addition and preferably, however, the electrode 62 also has a surface contour such as, for example, a corrugation or a wave shape. Such a structure increases the flow path of the liquid along the surface and thus the effective contact area, and if necessary it can also create turbulence or swirls in the liquid flow that further promote intimate contact with the surface. Furthermore, a particularly good electrical contact between electrode 62 and liquid is also further favoured by a suitable and particularly preferred choice of material.

Advantageously, the surface of the electrode 62 is made of a material that is a good conductor and also preferably of a material that is physiologically inert and well tolerated by the human body, in particular metal, especially preferably gold, platinum, magnesium or doped diamond. The electrode 62 can consist entirely of such a material in the form of a solid body, or alternatively it can also be formed by a coated carrier body, the surface coating consisting of one of the materials mentioned.

On the other hand, the electrode 62 is also designed in a particularly favourable manner for comparatively simple assembly of the treatment head 2. The preferred design criteria are that the connecting pin 42 provided with the insulator body 54 should be able to be easily inserted over the lower end of the treatment head 2 into its outer housing 40 for the purpose of simple assembly, and that the inserted connecting pin 42 should find a comparatively firm hold and a good fit in the outer housing 40 after its assembly. In order to be able to fulfil both criteria equally, the electrode 62 is advantageously designed in such a way that it resiliently allows a temporary widening of its clear inner cross-section.

To this end, in a preferred embodiment, the electrode 62 may be in the form of an openwork ring or snap ring or in the form of a slotted tubular piece. In the embodiment example, the electrode 62 in the very particularly preferred embodiment is shown as a spring or coiled wire. On the one hand, such a design offers the advantage of the desired elasticity in case of temporary expansion, and on the other hand, the surface is wavy or corrugated due to the design.

The design of the treatment head 2 ensures that the electric current applied for treatment and cleaning purposes can flow through the bacteria-infested surface zone of the component requiring treatment and from there largely directly, i.e. in particular without "detours" via further body tissue or the like, to the outflow surface 60 serving as the contact surface. In the embodiment example, the media channels 12, 58 including the electrically conductive treatment fluid guided therein and the corresponding connection elements thus form a second conductive element forming an electrical current path to the actual conductive element 14 in the connecting tube 4.

In order to avoid or at least reduce excessive leakage during the discharge of the treatment liquid, a sponge surrounding the mouth area of the treatment head is provided in the area of the discharge surface 60 and thus at the "free" end of the treatment head.

In the embodiment example, the application of treatment fluid to the inner channel 52 of the connecting pin 42 is also provided. In order to counteract the problem of an electrical short-circuit between the two electrodes, formed on the one hand by the connecting pin 42 and on the other hand formed by the electrode 62 around which the treatment fluid flows, the insulator body 54 placed in the cavity 56 is provided on its outer region with a circumferential thread 64 in an embodiment considered to be independently inventive, as is clear in particular from the enlarged representation in FIG. 17. With the insulator body 54 inserted into the cavity 56, this thread 64 closes as flush as possible with the surrounding inner wall of the cavity 56. As a result, the thread 64 forms an extended flow path for the treatment fluid, since the latter, guided by the thread 64, must flow spirally around the insulator body 54. Due to this artificial extension of the flow path, the electrical path length in the treatment fluid in the cavity 56 is correspondingly extended, which increases its electrical resistance accordingly. In this way, it is possible to keep a short-circuit or leakage current "upwards", i.e. towards the inflow area into the connecting pin 42, as low as possible, as this leakage current would not be available for the intended cleaning effect.

In FIGS. 18 and 19, the ensemble composed of the connecting pin 42 and the insulator body 54 is shown in perspective view (FIG. 18) and in longitudinal section (FIG. 19).

The aforementioned designs and individual parts, in particular the connecting tube 4 of the type described, the connecting pin 42, the insulator body 54 with a circumferential external thread 64, the electrode 62 with the aforementioned design criteria, the design of the treatment head 2, in each case individually or in combination with one another, and their use, in each case individually or in combination with one another, in a treatment system 1 of the aforementioned design, are expressly considered to be independently inventive.

The treatment liquid provided for use in the treatment system 1 is suitably selected and composed with regard to the aspects already known from WO 2014/075755 A1, WO 2014/122187 A1, WO 2014/122188 A1 and WO 2016/023998 A1. The selection and composition of the basic constituents of the treatment fluid is made in particular with regard to the intended mode of action, i.e. the application of an electric current in the spatial region of the surface requiring treatment, it being ensured in particular that a sufficiently high electrical conductivity for this purpose is present in the treatment fluid. This is to be ensured in particular by a sufficiently high selected ion density in the treatment liquid. For this purpose, a metal salt is provided as a basic component of the treatment liquid, preferably in aqueous solution. Particularly preferably, a solution containing the metal salt sodium formate is used. The metal salt provides the ions for the current transport and, in addition, the reaction products formed after the respective electrode reaction can also have suitable biochemical effects. When carrying out the cleaning procedure on an inserted implant, the specific choice of a sufficiently high electrical conductivity is intended to ensure that the current flow is through the treatment fluid and thus through the parts and components requiring treatment, but not through the patient's body tissue, so that any risk to the patient from an unwanted current flow through soft tissue, bone, blood and/or other body materials can be minimised. The electrical conductivity of the treatment fluid should preferably be a multiple of the electrical conductivity of blood, bone, soft tissue, fatty tissue or other body materials.

Consequently, the following conductivity values in particular are taken into account in the selection and composition of the basic components for the treatment fluid (the electrical conductivity a is given in the usual unit mS/cm):

Skin: 0.03-0.1 mS/cm
Bone: 0.06-0.2 mS/cm
Fat tissue: 0.20-1.0 mS/cm
Muscle tissue: 0.80-2.5 mS/cm
Blood: approx. 6.7 mS/cm
other body fluids: approx. 15 mS/cm In order to keep the hazard potential for the patient suitably low and to limit the current flow to the desired regions, the electrical conductivity should therefore be at least twice, preferably five times, particularly preferably ten times the conductivity of other body fluids. Therefore, the electrical conductivity of the treatment fluid should have a value of at least 30 mS/cm, preferably at least 75 mS/cm and particularly preferably at least 150 mS/cm. Compared to blood, this means that the electrical conductivity of the treatment fluid is preferably at least about five times, preferably at least somewhat ten times and particularly preferably at least about twenty times the conductivity of blood. Measurements have shown that when using a treatment fluid selected in this way, the electrical voltage to which the body tissue, blood, body fluids, etc. are subjected is less than 6 V, preferably less than 3 V, particularly preferably less than 1.5 V. This means that damage to the patient due to blood conductivity can be avoided. In this way, harm to the patient can be reliably excluded due to the voltages being kept low. In order to maintain such a conductivity, the ion concentration in the treatment fluid and in the basic components forming it is selected to be sufficiently high; alkalis, acids, salts and/or other ion-forming substances or substance compounds can be used for this purpose.

In the selection and composition of the basic components of the treatment fluid,—special consideration is given to the fact that the cleansing or biofilm-removing effect of the electrolytic treatment of a contaminated implant surface is based on a combination of several causes, which should be harnessed as complementarily to each other as possible. On the one hand, gases or gas bubbles can form during the current flow through the electrolyte, preferably in the area of the electrodes, which have a lifting (mechanical) effect on the biofilm. The formation of these gases takes place directly on the implant surface serving as the electrode and thus between this and the biofilm. The resulting gas bubbles influence the detachment process with their growth rate and maximum size.

The second cause of the electrolytic process cleaning the implant or removing the biofilm is the decomposing, destroying and dissolving effect of the electrolytically produced substances or substance compounds on the actual adhesion of the biofilm to the implant surface, i.e. on the adhesive or anchoring mechanism.

The third cause for the cleaning or detaching effect of the electrolytic process is—based on material removal effects of the implant material, whereby components or particles of the actual implant are dissolved out of it in its surface area.

The fourth cause for the cleaning or detaching effect of the electrolytic process is based on the oxide layer formation of metallic implants that allow this. Here, metal atoms of the metallic base material penetrate the possibly already existing oxide layer based on the applied electrical voltage and react with substances of the electrolyte (mostly oxygen=>metal oxide formation). In the case of metals that do not form an oxide layer or a mechanically stable oxide layer, non-oxide compounds can also be formed (mostly salts), which then go into solution.

The basic components provided for the formation of the treatment fluid are suitably selected and combined with each other with regard to these effects. In addition, it is taken into account as a basic design objective that no toxic effects or effects otherwise endangering a patient or unpleasant for him should occur, so that the treatment fluid is also suitable for use on the inserted dental implant, i.e. in the patient's mouth. In the embodiment example, at least one salt on the one hand and an acid on the other hand, preferably diluted with water, are provided as basic components, the selection and composition of which is based in particular on the criteria mentioned. Phosphoric acid, citric acid, formic acid, acetic acid, lactic acid, carbonic acid or a combination thereof is particularly preferred as the acid.

Alternatively or additionally particularly preferred is provided as salt sodium, calcium, aluminium, magnesium, tin or potassium iodide, chloride, nitrate, carbonate or hydrogen carbonate and/or ammonium chlorite, nitrate or iodide or a combination of these. Sodium formate is the sodium salt of formic acid with the constitutional formula Na(HCOO).

The treatment system 1 and, in particular, its electrical supply unit 8 and/or a control system assigned to it is designed for coordinated process control in the sense that the supply of the treatment liquid on the one hand and the application of current on the other hand are carried out in a coordinated manner. For this purpose, it can be provided, for example, that the pump 34 for the treatment fluid, which is assigned to the connecting hose 4 or the reservoir 6, is controlled via the supply unit 8 in a manner coordinated with the supply of current to the conductor elements 14. This can be automated or, if necessary, manually controlled via a switch. A manually operated switch can in particular be arranged directly in the treatment head 2 so that the operator can access the system control when treating the patient.

LIST OF REFERENCE SIGNS

1 Treatment system
2 Treatment head
4, 4' Connecting hose
4a Cable harness
6 Storage container
8 electrical supply unit
10 Coat
12 Media channel
14 Ladder element
16 Protrusion
17 Side surface
18 Contour
19 Edge
20 Contacting system
22 Connection module
24 Contact socket
25 Outer casing
26, 28 Housing halves
30 Hose nozzle
32 Supply hose
34 Pump
36 Contact pin
38 Through hole
39 Inner tube
40 Outer casing
42 Connecting pin
44 End
46 Recess
48 End
50 Spring bar
52 Inner duct
54 Insulator body
56 Cavity
58 Media channel
60 Outflow area
62 Electrode
64 Thread

What is claimed is:

1. A contacting system (20) for electrical contacting of electrical conductor elements (14) embedded in an insulating sheath (10) of a cable harness (4a), having a connection module (22), in the outer housing (25) of which a hose connector (30) is arranged, onto which a section of a connection hose (4) comprising the cable harness (4a) as well as a media duct (12) for a treatment fluid can be plugged and thus fixed in the outer housing (25), and with contact pins (36) which, viewed from the side relative to the longitudinal direction of the cable harness (4a), are guided transversely through the outer housing (25) and are positioned in the latter in such a way that they make electrical contact with the conductor elements (14) in the subsection of the cable harness (4a) fixed in the outer housing (25) in the region of a respective bulge (16) of the connecting hose (4).

2. The contacting system (20) according to claim 1, wherein the contact pins (36) are positioned at a distance from one another relative to one another in such a way that the cable strand (4a) stripped in the subsection fits straight between the contact pins (36), preferably in a slightly clamping manner.

3. A treatment system (1) for electrolytic cleaning of a component contaminated with a biofilm, which comprises the contacting system (20) according to claim 2.

4. A treatment system (1) for electrolytic cleaning of a component contaminated with a biofilm, which comprises the contacting system (20) according to claim 1.

5. A method of cleaning a component contaminated with a biofilm using a contacting system (20) for electrical contacting of electrical conductor elements (14) embedded in an insulating sheath (10) of a cable harness (4a), having a connection module (22), in the outer housing (25) of which a hose connector (30) is arranged, onto which a section of a connection hose (4) including the cable harness (4a) as well as a media duct (12) for a treatment fluid can be plugged and thus fixed in the outer housing (25), and including contact pins (36) which, viewed from the side relative to a longitudinal direction of the cable harness (4a), are guided transversely through the outer housing (25) and are positioned in the outer housing (25) is such a way that the contact pins (36) make electrical contact with the conductor elements (14) in the subsection of the cable harness (4a) fixed in the outer housing (25) in the region of a respective bulge (16) of the connecting hose (4), the method comprising:

applying the contacting system to the component contaminated with the biofilm; and electrolytically removing the biofilm from the component.

6. A method of cleaning a component contaminated with a biofilm using a contacting system (20) for electrical contacting of electrical conductor elements (14) embedded in an insulating sheath (10) of a cable harness (4*a*), having a connection module (22), in the outer housing (25) of which a hose connector (30) is arranged, onto which a section of a connection hose (4) including the cable harness (4*a*) as well as a media duct (12) for a treatment fluid can be plugged and thus fixed in the outer housing (25), and including contact pins (36) which, viewed from the side relative to a longitudinal direction of the cable harness (4*a*), are guided transversely through the outer housing (25) and are positioned in the outer housing (25) in such a way that the contact pins (36) make electrical contact with the conductor elements (14) in the subsection of the cable harness (4*a*) fixed in the outer housing (25) in the region of a respective bulge (16) of the connecting hose (4), wherein the contact pins (36) are positioned at a distance from one another relative to one another in such a way that the cable strand (4*a*) stripped in the subsection fits straight between the contact pine (36), in a clamping manner the method comprising:

applying the contacting system to the component contaminated with the biofilm; and electrolytically removing the biofilm from the component.

* * * * *